United States Patent Office 3,775,490
Patented Nov. 27, 1973

---

3,775,490
PREPARATION OF PENTAHALOBENZENES FROM TETRAHALOBENZENES
William W. Prichard, Hockessin, Del., assignor to E. I. du Pont de Nemours and Company, Wilmington, Del.
No Drawing. Filed Dec. 15, 1971, Ser. No. 208,466
Int. Cl. C07c *25/02, 25/04*
U.S. Cl. 260—650 R   6 Claims

ABSTRACT OF THE DISCLOSURE

Described is a process for producing a compound $C_6HCl_2X_3$, where X is chlorine or fluorine, e.g., pentachlorobenzene, by reacting a compound of the formula $C_6H_2ClX_3$, e.g., any of the tetrachlorobenzene isomers, with phosgene or chlorine plus carbon monoxide.

BACKGROUND OF THE INVENTION

(1) Field of the invention

This invention relates to, and has as its principal object provision of, a novel process for the conversion of known tetrachloro- (or tetra-substituted chloro-fluoro-) benzenes to pentachloro (or penta-substituted chloro-fluoro-) benzenes in good yield by the reaction of one of the former compounds with phosgene or carbon monoxide plus chlorine.

(2) Relationship to the prior art

No art dealing with uncatalyzed halogenation by phosgene is known. The closest related art is British Pat. 987,516 and J. Am. Chem. Soc. 88, 3452 (1966). The former teaches the catalyzed chlorocarbonylation of carbocyclic compounds by reaction with chlorine and carbon monoxide, with at least part of the carbon monoxide plus halogen being provided by a carbonyl halide. This reaction is catalyzed by a Group VIII metal or metal compound, preferably palladium.

In the second reference, J. Tsuji and K. Ohno describe the decarbonylation of acyl halides under the catalytic action of rhodium complexes. When the structure of the acyl halide permits, the product is an olefin; in the other cases, a hydrocarbyl halide results.

In contrast to the above reactions, the instant invention avoids the use of noble metal catalysts and thereby provides a convenient and economic route to the expensive pentachlorobenzene.

DESCRIPTION OF THE INVENTION

This invention comprises the process of contacting and reacting at a temperature in the general range from 300 to 400° C. a tetrahalobenzene with a chlorine source selected from:

(1) phosgene, and
(2) carbon monoxide+chlorine.

The usual processes of direct chlorination of benzene by chlorine lead to high proportions of the relatively inexpensive tetrachlorobenzene and hexachlorobenzene. The present process permits control of the chlorination of tetrahalobenzenes to yield predominantly pentahalobenzenes.

The purely thermal reaction of this invention may proceed by the route:

$C_6H_2Cl_4 + COCl_2$ (or $CO + Cl_2$) ⟶ $C_6HCl_4COCl + HCl$

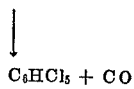

$C_6HCl_5 + CO$ as suggested by the presence of small amounts of the tetrachlorobenzoyl chlorides in the reaction mixture and by the knowledge that at lower temperatures in the presence of noble catalysts, chlorocarbonylation is the major reaction.

Although 1,2,4,5-tetrachlorobenzene is the preferred isomer for the preparation of pentachlorobenzene by the process of this invention, since it is the isomer most readily obtained by direct chlorination of benzene, the 1,2,3,4- and 1,2,3,5-tetrachlorobenzenes or a mixture of all three isomers are equally suitable. One or more of the chlorines may be replaced by fluorine to give 1-fluoro-2,4,5-trichlorobenzene, 1,3-difluoro-2,4 - dichlorobenzene or 1,3,4-trifluoro-5-chlorobenzene or isomers thereof as suitable starting materials for reaction with phosgene. The equation for the reaction may thus be generalized as $C_6H_2ClX_3 + COCl_2$ (or $CO + Cl_2$) ⟶ $C_6HX_3COCl + HCl$

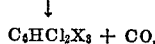

$C_6HCl_2X_3 + CO$, where X is chlorine or fluorine.

The reaction temperature may range from about 300° C. up to the decomposition temperature of the products. The reactions are usually run at 300–400° C., and preferably at 325–400° C.

The ratio of tetrahalobenzene to phosgene should be within the range of 1:2 to 10:1. At higher phosgene ratios, excessive chlorination occurs and low yields of the pentahalobenzenes result, while at lower phosgene ratios, although the yields are good, the conversions are low and relatively large amounts of tetrahalobenzene must be recycled. The preferred range of operation is at a halobenzene:phosgene mole ratio of 1:1 to 3:1.

When the phosgene is replaced by carbon monoxide plus chlorine, the same mole ratio of halobenzene to chlorine should be employed.

When the carbon monoxide procedure is used, the carbon monoxide partial pressure should be at least 50 atmospheres and generally the synthesis is carried out at 50–100 atmospheres of carbon monoxide pressure. Lower carbon monoxide pressures result in overchlorination to the hexahalobenzene and higher carbon monoxide pressures stabilize the tetrahalobenzoyl chloride and result in lower yields of the pentahalobenzenes. In the latter instance, there is no net loss as the tetrahalobenzoyl chlorides decarbonylate on being recycled.

EMBODIMENTS OF THE INVENTION

There follow some examples representing embodiments of the invention. In the small-scale experiments, the phosgene was measured by volume at −80° C., a procedure that is accurate to about 5%.

The reaction mixtures were analyzed by gas-liquid partition chromatograph (GLPC) on a 6′ x ¼ column packed with 20% "SE–30" silicon gum rubber (methyl) on 60–80 mesh "Chromsorb-W" at 250° C. and a helium flow of 50 ml./minute. The analyses were calibrated by the use of known standard mixtures of the reactants and products. Yields are given in mole percentages determined by relative gas chromatogram areas.

It should be noted that Examples 1(B) and 3(B) are controls in which the phosgene or chlorine/carbon monoxide reactant of the invention is replaced by chlorine.

EXAMPLE 1

(A) A pressure vessel, lined with "Hastelloy C" was charged with one molar equivalent of phosgene and two equivalents of 1,2,4,5-tetrachlorobenzene. The vessel was sealed, heated at 300° C. for 1 hour, then at 350° C. for 2 hours, cooled, vented and opened. The light-colored solid product consisted of a mixture of 66.3% recovered 1,2,4,5 - tetrachlorobenzene, 27.7% pentachlorobenzene, 1.13% of 2,3,5,6 - tetrachlorobenzoyl chloride and 4.9% hexachlorobenzene. Thus, 33% of the starting material has been converted to products with an 81.2% yield of pentachlorobenzene, 3.3% yield of tetrachloroacid chloride and 14.6% of hexachlorobenzene.

(B) The vessel of Example 1(A) was charged with 1 equivalent of chlorine and two equivalents of 1,2,4,5-tetrachlorobenzene and heated for 2 hours at 350° C. The product consisted of 63.5% recovered 1,2,4,5-tetrachlorobenzene, 21.5% pentachlorobenzene, and 15.0% hexachlorobenzene or a 36.5% conversion to a 59% yield of pentachlorobenzene and 41% yield of hexachlorobenzene. The unwanted hexachlorobenzene thus becomes a major product when chlorine alone is employed.

EXAMPLE 2

The vessel of Example 1 was charged with two equivalents of 1,2,4,5 - tetrachlorobenzene, one equivalent of chlorine, and 50 atmospheres of CO pressure at ambient temperature. The vessel was heated for 2 hours at 350° C. The product consisted of 66.8% recovered 1,2,4,5-tetrachlorobenzene, 25.5% pentachlorobenzene, 1.16% of 2,3,5,6 - tetrachlorobenzoyl chloride and 6.08% of hexachlorobenzene. The conversion was thus 33.2% and the yield of pentachlorobenzene 76.8%.

EXAMPLE 3

(A) The vessel of Example 1 was charged with two equivalents of 1,3 - difluoro - 4,6 - dichlorobenzene and one equivalent of phosgene. The sealed vessel was heated for 1 hour at 300° C. and 2 hours at 350° C. The colorless liquid product was analyzed by GLPC (column temperature 200° C.) and found to consist of 81.2% uncharged starting material, 16.6% of a mixture of two trichlorodifluorobenzenes and 2.5% of a mixture of four other unidentified products. The pentahalobenzene mixture was shown by ¹⁹F NMR to be a 4:1 mixture of 1,3 - difluoro - 4,5,6 - trichlorobenzene and 1,3 - difluoro-2,4,6 - trichlorobenzene. The yield of the pentahalobenzene mixture was 88.5%.

(B) In a similar reaction in which chlorine replaced the phosgene the product was partly solid and analyzed for 27.7% recovered starting material, 27.2% of

$C_6HF_2Cl_3$ isomers, 22.7% of $C_6F_2Cl_4$ isomers, 13.3% of a product believed to be $C_6FCl_5$, but not positively identified, and 9.1% of $C_6Cl_6$. It is evident that substitution of chlorine for phosgene as the chlorinating agent results in a complex mixture of unwanted products.

EXAMPLE 4

A charge of 216 g. (1 mole) of 1,2,4,5-tetrachlorobenzene and 50 g. (0.505 mole) of phosgene was placed in a rocker-bomb lined with "Hastelloy C," sealed and heated for 1.5 hours at 350° C. with agitation. The bomb was cooled, vented and the contents discharged. The grey solid product analyzed for 50.3% of 1,2,4,5-tetrachlorobenzene, 42.5% of pentachlorobenzene and 7.2% of hexachlorobenzene. The yield of pentachlorobenzene was 85.5%. The product was separated into its components by distillation at atmospheric pressure through an efficient fractionating column.

EXAMPLE 5

The vessel of Example 1 was charged with three equivalents of 1,2,3,4 - tetrachlorobenzene and 1 equivalent of phosgene, sealed and heated for 2 hours at 350° C. Analysis of the product, which was partly solid, partly liquid, showed it to consist of 60.7% recovered 1,2,3,4-tetrachlorobenzene, 38.4% pentachlorobenzene and 0.9% hexachlorobenzene. The conversion is thus 39.3% or slightly more than theoretically possible, but within the limits of accuracy by which the small amount of phosgene used was measured. The yield of pentachlorobenzene is 97.8%.

EXAMPLE 6

The pressure vessel of Example 1 was charged with 3.24 g. (0.015 mole) of 1,2,4,5 - tetrachlorobenzene and 1.0 g. (0.015 mole) of phosgene, and the mixture heated for 1 hour at 300° C., then for 2 hours at 350° C. The 3.37 g. of product obtained comprised 43.0% 1,2,4,5-tetrachlorobenzene, 36.7% pentachlorobenzene (64.2% yield), 3.6% tetrachlorobenzoyl chloride (6.3% yield) and 16.8% hexachlorobenzene (29.4% yield). The total conversion was 57%.

The embodiments of the invention in which an exclusive property or privilege is claimed are defined as follows:

1. The process of preparing a compound of the formula $C_6HCl_2X_3$, where X is chlorine or fluorine, which comprises reacting
   a tetrahalobenzene of the formula $C_6H_2ClX_3$ with phosgene in about a 1:2 to 10:1 tetrahalobenzene: phosgene ratio,
   at a temperature in the range 300° C. up to the decomposition temperature of the products and
   in a sealed vessel.

2. The process of claim 1 wherein the temperature is in the range 300–400° C.

3. The process of claim 1 wherein 1,2,4,5-tetrachlorobenzene is reacted with phosgene to produce pentachlorobenzene.

4. The process of claim 1 wherein 1,3-difluoro-4.6-dichlorobenzene is reacted with phosgene to produce a trichlorodifluorobenzene.

5. The process of claim 1 wherein 1,2,3,4-tetrachlorobenzene is reacted with phosgene to produce pentachlorobenzene.

6. The process of claim 1 wherein at least one tetrachlorobenzene isomer is reacted with phosgene to produce pentachlorobenzene.

References Cited

UNITED STATES PATENTS 2,608,591   8/1952   Lawlor _____ 260—650 R

FOREIGN PATENTS 1,553,360   12/1968   France _____ 260—612

OTHER REFERENCES

Ponomarenko: Chem. Abst., 59, 12666b, 1963.
Beilstein: vol. 3, 2nd supplement, 1942, pp. 12–14.
Runge: Chem. Abst., 51, 6358b, 1957.

HOWARD T. MARS, Primary Examiner

U.S. Cl. X.R.

260—650 F